[19] United States Patent
Holloway et al.

[11] 3,901,960
[45] Aug. 26, 1975

[54] METHOD OF MANUFACTURING BATTERY PLATE GRIDS

[75] Inventors: Frank Raymond Holloway, Sutton Coldfield; James Michael Farley, Birmingham, both of England

[73] Assignee: Joseph Lucas (Industries) Limited, Birmingham, England

[22] Filed: Nov. 9, 1972

[21] Appl. No.: 304,972

Related U.S. Application Data

[63] Continuation-in-part of Ser. No. 80,471, Oct. 13, 1970, abandoned.

[30] Foreign Application Priority Data

Oct. 13, 1969  United Kingdom............... 50181/69

[52] U.S. Cl. ................. 264/104; 264/105; 264/112; 264/113; 264/126; 264/272; 264/279
[51] Int. Cl.$^2$........................................ C04B 35/00
[58] Field of Search ........... 264/104, 112, 113, 126, 264/127, 272, 279, 105

Primary Examiner—Robert F. White
Assistant Examiner—J. R. Hall
Attorney, Agent, or Firm—Holman & Stern

[57] ABSTRACT

A method of manufacturing a battery plate grid includes the steps of applying a layer of conductive material onto a mould, inserting a conductive battery plate lug having an extension integral therewith into the mould, filling the remainder of the mould with particles of a sinterable, thermo-plastic synthetic resin material, heating the synthetic resin material until the resin is fully sintered, the extension of the lug thereby being trapped by the sintered resin and the conductive material from the mould thereby becoming firmly adhered to the lower surface of the sintered resin as a continuous, conducting layer, cooling the sintered resin until it hardens, and then removing the resultant grid from the mould.

10 Claims, No Drawings

METHOD OF MANUFACTURING BATTERY PLATE GRIDS

This invention relates to a method of manufacturing battery plate grids and is a continuation-in-part of our application Ser. No. 80,471 filed Oct. 13, 1970, now abandoned.

It is known that grids for electric storage batteries and, in particular lead-acid batteries can be produced from synthetic resin materials. However, although the advantages of synthetic resin grids, both from the point of view of their lightness and their cheapness, having long been recognised, considerable difficulties have in the past been experienced in rendering such grids conductive. The object of the present invention is to provide an effective solution to this problem.

According to the invention, a method of manufacturing a battery plate grid comprises the steps of:
   a. applying a layer of electrically conductive particulate material onto the surface of a mold from which said material can be released;
   b. placing a conductive battery plate lug having an integral extension into said mold, the lug making electrical contact with said conductive material;
   c. introducing sinterable particulate thermoplastic synthetic resin over said layer of conductive material, the resin covering said extension;
   d. heating said resin in said mold at a temperature sufficient to sinter said resin until the resin is fully sintered into a substantially nonporous mass, the conductive material thereby being released from said mold to firmly adhere to the surface of said mass presented to the mold as a continuous conducting layer, and said extension thereby being trapped within said mass;
   e. cooling said mass in said mold until the resin hardens; and
   f. removing the battery grid from the mold.

It will therefore be appreciated that the method of the invention employs a particulate synthetic resin material which is thermo-plastic and is sinterable. In this respect, the term "sinterable" is used in its commonly accepted sense, see for example Webster's Seventh New Collegiate Dictionary, to mean a material which on heating becomes a coherent non-porous mass without melting. Examples of thermo-plastic synthetic resin materials which sinter on heating, and therefore can be used in the method of the invention, are polyvinyl chloride, polyvinyl chloride co-polymers, polyolefins such as polypropylene, and polycarbonates. Of these sinterable, thermo-plastic synthetic resin materials, particulate polyvinyl chloride is preferred since, when sintered into a battery plate grid by the method described in the preceding paragraph, it undergoes shrinkage which is moderate and also is controlled and further the resultant grid is rigid, but not too brittle. Moreover, the resultant grid adheres strongly to the particulate conductive material on the mold.

It is important to ensure that the sintering of the thermo-plastic material continues until the material is fully sintered, that is until substantially all the thermo-plastic particles have adhered together into a coherent non-porous mass. The complete sintering of the thermoplastic particles not only ensures that the extension of the lug is trapped by the sintered resin, but is also found to result in the conductive material being released from the mold and becoming firmly adhered to the surface of the sintered resin presented to the mold as a continuous conducting layer. It will therefore be appreciated that, to ensure complete sintering of the synthetic resin material, it is important that the particle size of the resin is not too large. Although the preferred particle size varies from resin to resin and also with other parameters in the process, in general it is desirable to ensure that the particle size of the resin is below 250 microns. Similarly, although the preferred temperature for the heating of the resin particles in the mold varies from resin to resin, the temperature must at least be equal to, and preferably exceed, the temperature at which the resin sinters.

After sintering of the thermo-plastic synthetic resin material, the coherent mass thus produced is allowed to cool until the sintered resin hardens, before the mass is removed from the mold. This is of course important since otherwise the sintered mass will be very soft so that handling will be difficult and will tend to damage the conductive coating. The actual temperature to which the sintered mass is allowed to cool before the mass is removed from the mold will vary from resin to resin and will of course depend upon the softening point of the particular resin concerned. However, in the preferred case of polyvinyl chloride, the sintered material should be allowed to cool below 70°C before being removed from the mold.

The conductive material which is first applied to the mold and then, later in the process, becomes firmly adhered to the sintered synthetic resin, can take a variety of forms, such as silver, zinc and tin. However, the preferred conductive material is graphite since, as well as providing a conductive coating on the sintered grid, the graphite acts as a release agent between the grid and the mold to prevent the grid sticking to the mold. Thus, where other conductive materials than graphite are used, a release agent must be applied to the mold before the application of the conductive material, a convenient release agent being polytetrafluoroethylene.

The conductive material is applied to plate grid mold in the form of particles and, although the particle size is not critical for the conductive material, it is to be understood that there tends to be a fall off in the electrical properties of the conductive coating produced if the particle size of the conductive material is too large. Conveniently, therefore, the particle size of the conductive material should lie within the range 2 microns to 20 microns. Application of the particulate conductive material to the mold is usually achieved by dispersing the conductive particles in a liquid, such as water, and then spraying the dispersion onto the mold. In the case of a water dispersant, it is necessary to pre-heat the mold so as to evaporate the water from dispersion. However, in other cases, such as for example using a trichloroethylene dispersant, pre-heating of the mold may not be necessary. In addition, where silver is to define the conductive material, the silver can conveniently be provided on the mold by spraying simultaneously from two separate spray guns silver nitrate solution and hydrazine hydrochloride solution respectively, the silver nitrate being reduced on the mold to form the required silver deposit.

The material of the mold is also not critical to the method of the invention, although it will be understood that the mold must be inert to the synthetic resin material and the conductive material it carries at the sintering temperature of the synthetic resin. Also the mold must allow the conductive material to be released from the surface of the mold and be transferred to the sintered synthetic resin. Thus convenient mold materials are graphite, aluminium and duralumin and, in addition, electro-formed copper molds plated with chromium have been found to be suitable.

The invention will now be more particularly described with reference to the following examples:

EXAMPLE 1

An aqueous dispersion of finely divided graphite having a particle size in the range 2 to 20 microns was sprayed through a mask onto a pre-heated graphite mold containing an impression of a battery plate grid, the mask defining the external shape of the grid. The water rapidly evaporated from the deposited spray leaving a continuous film of graphite on the upper surface of the mold. The mask was then removed and a lead part constituting a battery plate lug having an intregal extension of reduced cross-section was inserted into the mold into electrical contact with the graphite coating. The remainder of the mold was then filled with particles of polyvinyl chloride, as sold by I.C.I. under the trade name CORVIC H 65/36B, the resin consisting of fragmented, hollow spherical particles having an average particle size of between 30 and 45 microns.

A flat bar was then drawn across the plane surface of the mold to remove any excess polyvinyl chloride from the mold and spread the particles of the resin evenly into all parts of the mold, including the parts of the mold occupied by the lead part. The mold was then placed horizontally in a hot oven and was heated, without the application of pressure, to sinter the particles of polyvinyl chloride. The heating was continued until the resin particles were fully sintered so as to form a substantially non-porous, but flexible, polyvinyl chloride grid, having trapped therein the lead part constituting the battery plate lug. The temperature of the oven during the sintering operation was 240°C, which is considerably above the normal sintering temperature for polyvinyl chloride, and it was found that this arrangement was preferred since it was found to improve the transfer of the graphite layer from the mold to the grid and to improve the adherence of the graphite layer to the grid.

After cooling below 70°C, that is the softening point of polyvinyl chloride, the grid was removed from the mold and was found to have a continuous, conducting layer of graphite on the surface of the grid which had been in contact with the mold. After removal of the grid, the mold was cleaned with a rotary brush to remove any residues from the mold surface and thereby prepare the mould for a subsequent molding operation. The battery plate grids produced in accordance with the method of this example were found to have a film of graphite which was sufficiently conductive to provide in use, the required electrical connection between the battery plate lug and the active material with which the battery plate grid was later pasted.

Similar results were also obtained with other types of particulate polyvinyl chloride having average particle sizes varying between 45 microns and 110 microns. Also, co-polymers of vinyl chloride and vinyl acetate were found to be acceptable.

EXAMPLE 2

In a continuous process for producing battery plate grids, the aqueous dispersion of finely divided graphite used in the previous example was sprayed onto a plurality of pre-heated graphite molds, each containing the impression of a pair of battery plate grids and then lead parts were inserted into the molds into electrical connection with the graphite, each lead part defining a pair of interconnected battery plate lugs each having an integral extension. The process was then continued as in the previous example, the molds being carried between the different operating stations on a conveyor.

EXAMPLE 3

Finely divided silver having a particle size of less than 3 microns was dispersed in trichloroethylene and was sprayed through a mask defining the external shape of a battery plate grid onto a graphite mold. The mold contained an impression of the battery plate grid and had previously been sprayed with polytetrafluoroethylene. The trichloroethylene rapidly evaporated from the deposited spray to leave a continuous film of silver on the upper surface of the mold, which conveniently could have been pre-heated to between 70°C and 100°C to facilitate evaporation of the organic solvent. The process then proceeded as in the previous examples.

EXAMPLE 4

The process of example 1 was successfully repeated using an aluminium mold. Also, after removal of the mold from the sintering oven and while the grid was in the mold and was still hot, that is at about 200°C, a further layer of the dispersion of conductive material was sprayed through the mask onto the surface of the grid remote from the mold. In this way, it was possible to form a conductive coating on both sides of the grid.

EXAMPLE 5

The process of example 1 was now repeated using particulate polypropylene as the synthetic resin material instead of polyvinyl chloride. The polypropylene used was that sold by I.C.I. Limited as PXE 6661 and had an average particle size of 250 microns. The sintering operation was performed at a temperature of about 240°C and the resultant grid was found to have the required continuous, conductive coating of graphite.

We claim:

1. A method of manufacturing a battery plate grid comprising:
   a. applying a layer of graphite having a particle size in the range of 2 to 20 microns onto the surface of a mold;
   b. placing a conductive battery plate lug having an integral extension into said mold, the lug making electrical contact with said graphite;
   c. introducing sinterable particulate thermoplastic synthetic resin over said layer of graphite, the resin covering said extension;
   d. heating said resin in said mold at a temperature sufficient to sinter said resin and trap said extension within the sintered resin, the heating being continued until the resin is fully sintered into a substantially non-porous mass and the graphite is firmly adhered to the surface of said mass presented to the mold as a continuous conducting layer;
   e. cooling said mass in said mold until the resin hardens; and f. removing the battery plate grid from the mold, said graphite acting as a release agent to prevent the grid from sticking to the mold.

2. The method of claim 1, further including, between steps (d) and (e), the step of applying a layer of particulate conductive material to the surface of the grid not in contact with the mold.

3. The method of claim 1, wherein the sinterable thermoplastic synthetic resin material is selected from the group consisting of polyvinyl chloride, polyvinyl chloride copolymers, polypropylene and polycarbonates.

4. The method of claim 1, wherein the sinterable thermoplastic synthetic resin material has a particle size less than 250 microns.

5. The method of claim 1, wherein step (a) is performed by preheating said mold and spraying a water dispersion of said graphite onto said surface of said mold, whereby the water is evaporated leaving said layer of graphite.

6. The method of manufacturing a battery plate grid comprising:
   a. applying a release agent to the surface of a mold;
   b. applying a layer of electrically conductive particulate material having a particle size in the range of 2 to 20 microns over the release agent on the surface of the mold;
   c. placing a conductive battery place lug having an integral extension into said mold, the lug making electrical contact with said conductive material;
   d. introducing sinterable particulate thermoplastic synthetic resin over said layer of conductive material, the resin covering said extension;
   e. heating said resin in said mold at a temperature sufficient to sinter said resin and trap said extension within the resin, the heating being continued until the resin is fully sintered into a substantially non-porous mass and the conductive material is firmly adhered to the surface of said mass presented to the mold as a continuous conducting layer;
   f. cooling said mass in said mold until the resin hardens; and
   g. removing the battery plate grid from the mold, said release agent preventing the grid from sticking to the mold.

7. The method of claim 6, wherein the conductive material is selected from the group consisting of silver, zinc, and tin.

8. The method of claim 6, further including, between steps (e) and (f), the step of applying a layer of particulate conductive material to the surface of the grid not in contact with the mold.

9. The method of claim 6, wherein the sinterable thermoplastic synthetic resin material is selected from the group consisting of polyvinyl chloride, polyvinyl chloride copolymers, polypropylene and polycarbonates.

10. The method of claim 6, wherein the sinterable thermoplastic synthetic resin material has a particle size of less than 250 microns.

* * * * *